United States Patent [19]

Ricci

[11] 4,203,423
[45] May 20, 1980

[54] VEHICLE SAFETY DEVICE

[75] Inventor: Donald C. Ricci, Warwick, R.I.

[73] Assignee: Sno-Go Inc., Warwick, R.I.

[21] Appl. No.: 930,876

[22] Filed: Aug. 3, 1978

Related U.S. Application Data

[63] Continuation-in-part of Ser. No. 810,367, Jun. 27, 1977, abandoned.

[51] Int. Cl.² .................... B60B 39/00; F24J 3/00
[52] U.S. Cl. .................... 126/271.1; 137/871;
   137/883; 291/3
[58] Field of Search .............. 137/883, 871, 862, 875;
   237/12.3 R; 126/271.1, 271.2 R, 271.2 A, 19.5;
   291/11 R, 3, 1 R

[56] References Cited

U.S. PATENT DOCUMENTS

| 1,277,333 | 8/1918 | Meakin . | |
| 1,447,004 | 2/1923 | Anthon | 291/3 |
| 2,004,859 | 6/1935 | Farley | 291/3 X |
| 2,214,736 | 9/1940 | Carmichael et al. | 137/875 X |
| 2,325,901 | 8/1943 | Atkinson . | |
| 2,483,554 | 10/1949 | Nash | 126/271.1 |
| 2,677,563 | 5/1954 | Weiner | 126/271.1 |
| 2,727,770 | 12/1965 | Davis | 291/11 R |
| 3,201,159 | 8/1965 | Williams | 291/3 |
| 3,232,287 | 2/1966 | Gillingham et al. | 126/271.1 |
| 3,289,668 | 12/1966 | Drucker | 291/3 X |
| 3,770,049 | 11/1973 | Wright | 165/41 |

FOREIGN PATENT DOCUMENTS 509718 3/1952 Belgium ..................... 291/1

*Primary Examiner*—Irwin C. Cohen
*Attorney, Agent, or Firm*—Salter & Michaelson

[57] ABSTRACT

A device for diverting exhaust gases from the engine of a vehicle such as an automobile to opposite tread surfaces of the driving wheel tires thereof. The device includes a valve assembly having a body interconnected to the vehicle exhaust system, conduits for diverting the above-indicated gas flow being joined to the body and extending outwardly therefrom. A valve member in the form of a pivoted plate is located within the body and is manually operated to divert the exhaust gases into the conduits for discharge at the driving wheels of the vehicle. The device is useful in removing ice or snow from the driving wheels as well as preventing hydroplaning thereof in wet weather.

1 Claim, 14 Drawing Figures

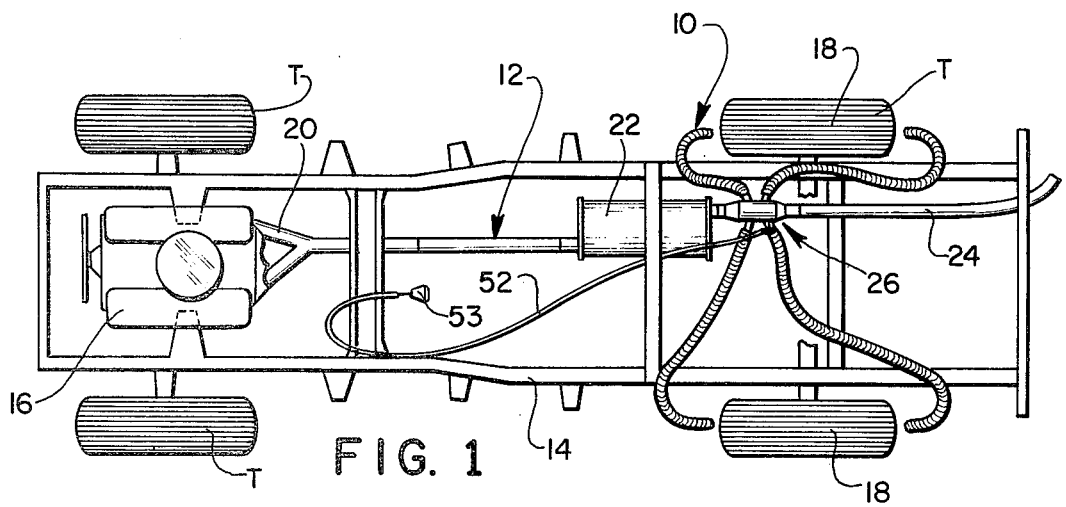
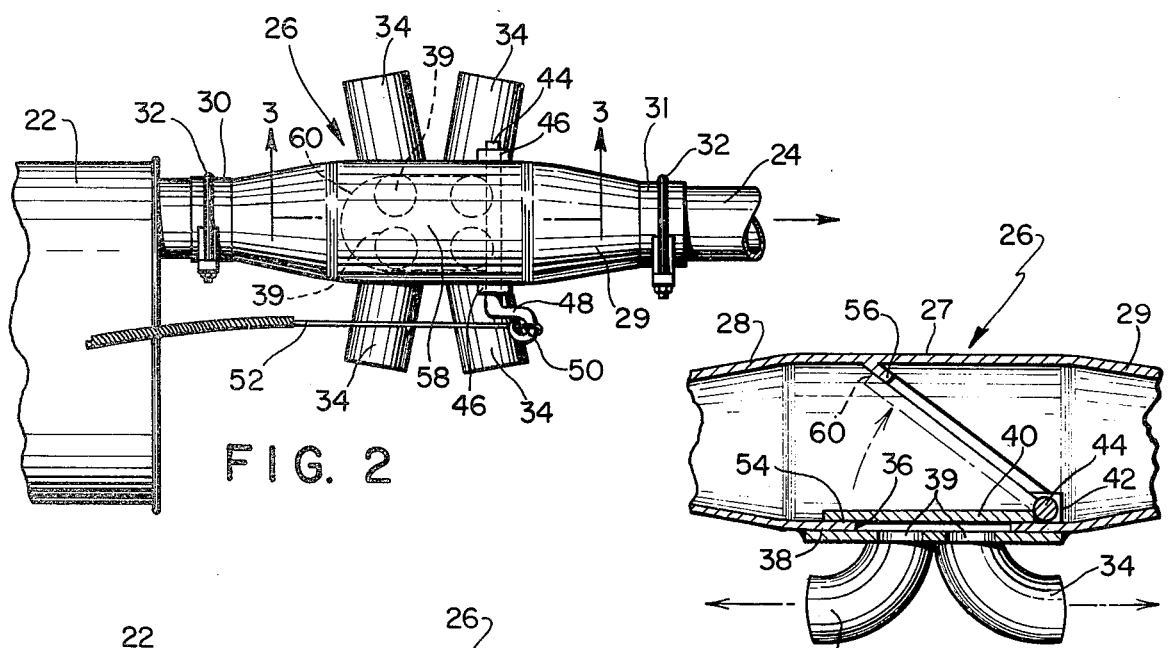
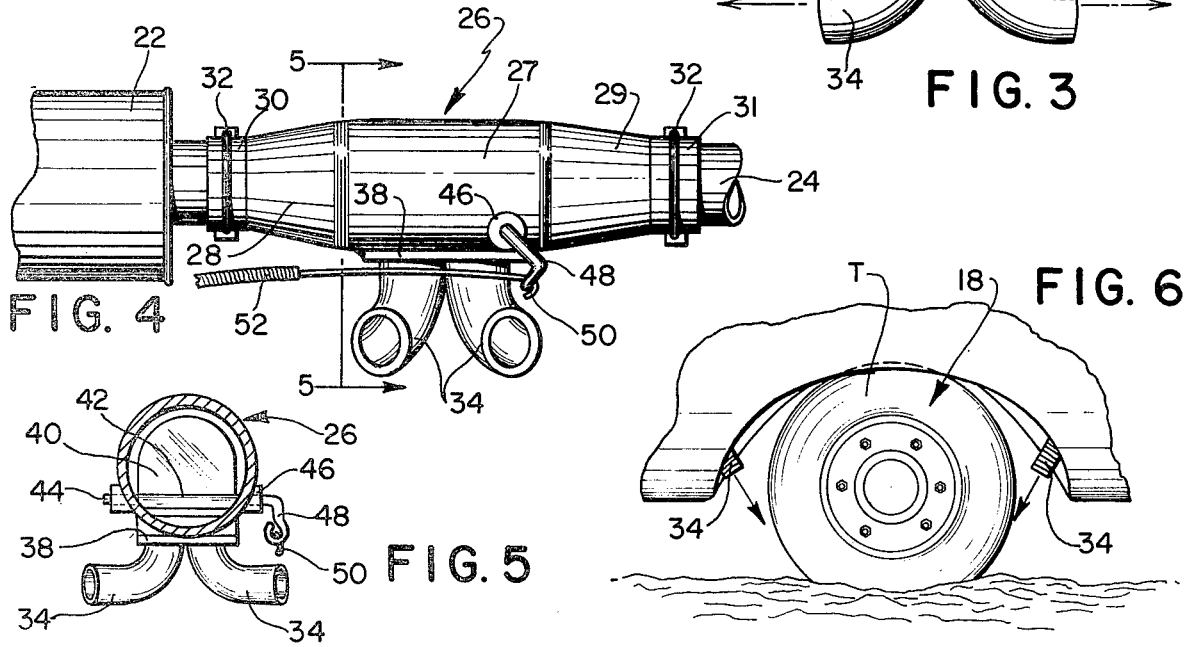

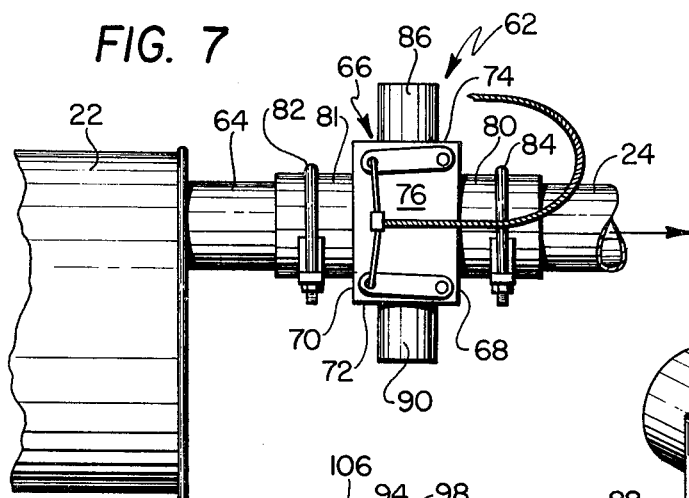
FIG. 7
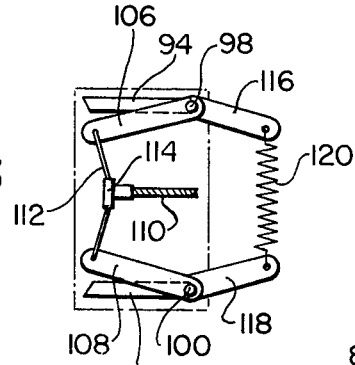
FIG. 13
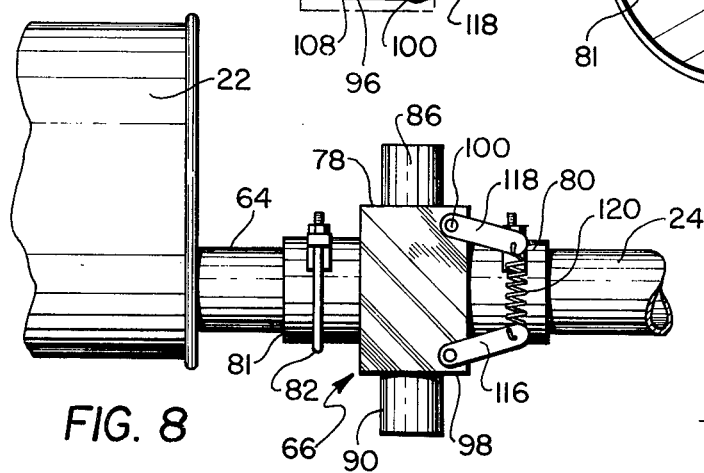
FIG. 8
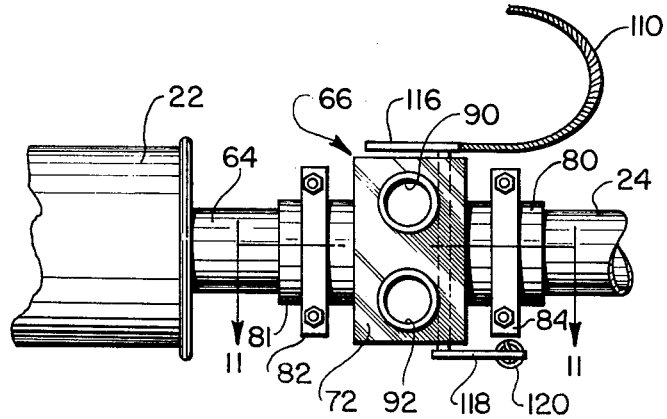
FIG. 9
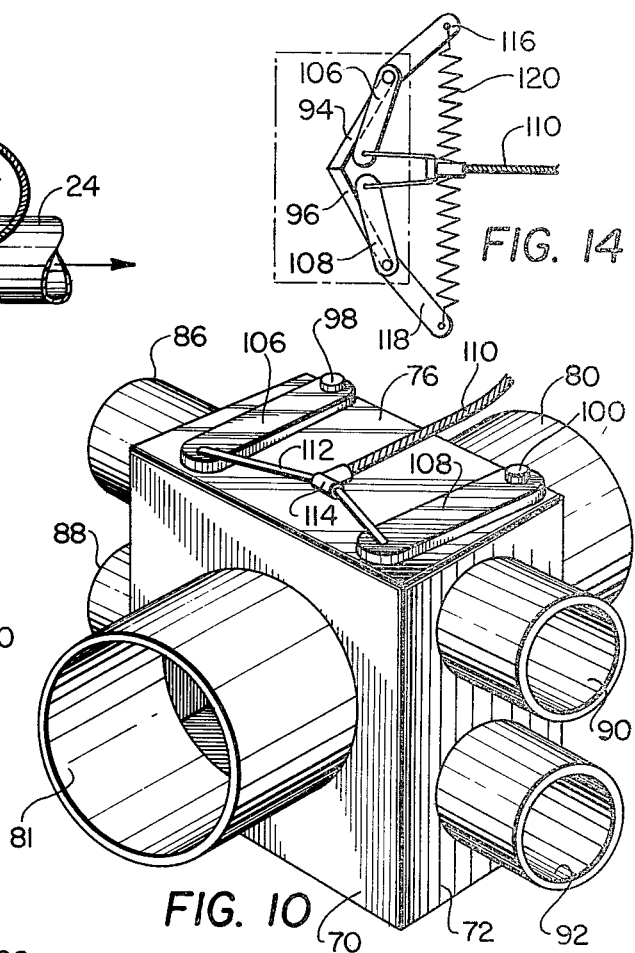
FIG. 14
FIG. 10
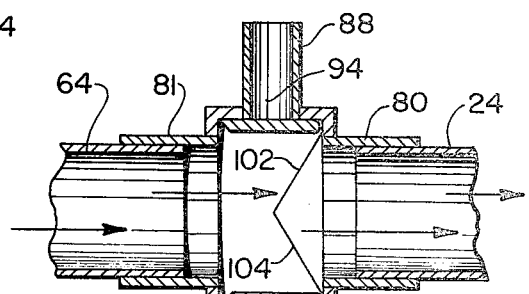
FIG. 11
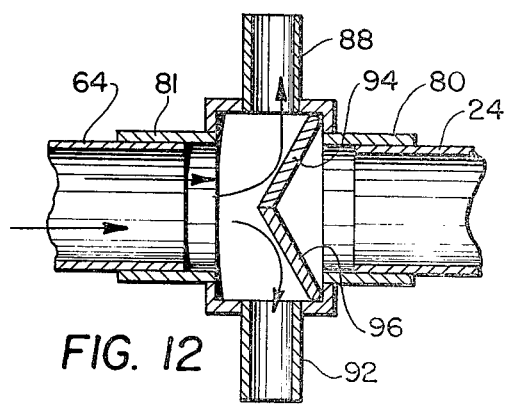
FIG. 12

VEHICLE SAFETY DEVICE

BACKGROUND OF THE INVENTION

This application is a continuation-in-part of Application Ser. No. 810,367 filed June 27, 1977, abandoned, and entitled Vehicle Safety Device.

The present invention relates to a safety device for removing ice, snow and water from the tread surface of tires of the driving wheels of vehicles and particularly automobiles and the like. The removal means comprises an attachment that is connected to the exhaust of the muffler and is operative to divert the hot exhaust gases from the engine muffler of the vehicle to the driving wheels thereof. Devices which generally divert exhaust gases for the purpose of deicing portions of a vehicle, as well as directing such gases particularly when mixed with sand into the forward travel path of such vehicles, is generally known. Devices of this type include those disclosed in the following U.S. Pat. Nos. 1,277,333 to MEAKIN issued Aug. 27, 1918; 1,447,004 to ANTHON issued Feb. 27, 1923; 2,325,901 to ATKINSON issued Aug. 3, 1943; 2,483,554 to NASH issued Oct. 4, 1949; 2,677,563 to WEINER issued May 4, 1954; 2,727,770 to DAVIS issued Dec. 20, 1955; 3,201,159 to WILLIAMS issued Aug. 17, 1965; 3,232,287 to GILLINGHAM et al issued Feb. 1, 1966; 3,289,668 to DRUCKER issued Dec. 6, 1966; and 3,770,049 to WRIGHT issued Nov. 6, 1973. Such devices are normally adapted for disposition upstream of a muffler when such is provided in the system or act as a replacement for such muffler and are further of somewhat complex configuration requiring extensive modification of existing vehicle construction.

In light of the above it is a primary object of the present invention to provide a safety system for automobiles and the like which enables ice, snow or water to be removed from the operative tread surfaces of the vehicle's driving wheels in a simple, low cost and straghtforward manner which further lends itself to retrofitting of existing automobiles.

A further object of the present invention is the provision of a safety system as above indicated in which a muffler is normally included and which provides for the normal discharge of exhaust gases through the exhaust system in the nonuse position of such device.

A still further object of the present invention is the provision of a safety device of the aforementioned type in which a convenient means for activating such to a use position is provided and in which, upon the deactivation thereof, the member thereof diverting the flow of exhaust gases to the tire tread surfaces will return to its normal nonuse position.

These and other objects of the present invention are accomplished by the provision of a safety device in the form of a valve assembly including a body having an inlet for receiving a portion of a vehicle exhaust pipe downstream from the muffler thereof and further having an outlet for receiving the remaining discharge portion of the exhaust system. Two pair of conduits, each terminating at one end thereof in openings respectively directed towards both the front and rear tread surfaces of a tire mounted on each of the driving wheels of the vehicle is further included. The opposite ends of such conduits connect with the valve body in a common connection which is normally closed from receiving exhaust gases by a pivotal valve member movable into an operable position for diverting the exhaust gases into such conduits.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a plan view of the chassis of an automobile showing the engine and exhaust system therefor in which the safety device of the present invention is mounted;

FIG. 2 is a top plan view on an enlarged scale of a portion of the system shown in FIG. 1 and shows in particular the manner in which the safety device of the present invention is interconnected to the vehicle's exhaust system;

FIG. 3 is a side sectional view taken along the line 3—3 of FIG. 2;

FIG. 4 is a side elevational view of the device of the present invention;

FIG. 5 is an end section taken along the line 5—5 of FIG. 4;

FIG. 6 is a partial elevational view of a vehicle driving wheel and fender portions showing the manner in which the conduits of the present invention are directed toward the tire tread surfaces thereof so as to remove snow, ice and water therefrom;

FIG. 7 is a top plan view of a modified valve construction as attached to the exhaust end of the muffler;

FIG. 8 is a bottom plan view of the modified form of the invention;

FIG. 9 is a side elevational view thereof;

FIG. 10 is an enlarged perspective view of the modified valve construction;

FIG. 11 is a sectional view taken along line 11—11 in FIG. 9 and shows the valve in the closed or inoperative position;

FIG. 12 is a sectional view similar to FIG. 11 and showing the valve in the open or operative position;

FIG. 13 in a top view of the modified form of the invention and shows the arms and spring in the closed or inoperative position of the valve; and FIG. 14 is a top view of the modified form of the invention and shows the arms and spring in the open or operative position of the valve.

DESCRIPTION OF THE INVENTION

Referring now to the drawing and in particular to FIG. 1, the safety device of the present invention is generally indicated at 10 and as shown is mounted on the exhaust system generally indicated at 12 of an automobile having a frame 14, an engine 16 and a pair of driving wheels 18. The exhaust system 12 as shown normally comprises a first Y-shaped tubular segment or pipe section 20 extending from the engine 16 to a muffler 22, and a second segment or exhaust pipe 24 extending rearwardly thereof for the discharge of exhaust gases at the rear of the vehicle. While the above described structural configuration is generally that of a passenger vehicle, the present invention is not so restricted and is adapted for use with commercial or off-the-road vehicles as well as those vehicles having front wheel or four wheel drive.

The safety device 10 of the present invention includes a body generally indicated at 26 of substantially tubular configuration having a circular cross section. The body 26 includes a central section 27 to which tapered forward and rear sections 28 and 29 are joined. Joined to the forward and rear sections 28 and 29 are inlet and outlet neck sections 30 and 31 respectively, which are connected to the muffler 22 and exhaust pipe 24 by standard U-clamps 32. Joined to the central section 27 of the body 26 at its lower surface thereof are a plurality of conduits 34 that extend substantially laterally from each side thereof and communicate at the innermost ends thereof with the interior of the body 26. A common junction for the conduits is formed by an opening 36 in the bottom wall of the central section 27 of the body 26, a plate 38 being secured to the underside of the central section and having openings 39 formed therein with which the innermost ends of the conduits 34 communicate. The conduits are generally, as are the other components of the device 10, formed with materials which are resistent to exhaust gases and preferably are in the form of flexible metal tubes. Such construction offers an advantage over preformed tubes which, although they may be utilized, require that a larger inventory of parts be maintained. Use of the flexible tubes insures that the device 10 can be mounted on various makes and models of vehicles since the flexible tubes will adapt to practically all models now in use. The tubes or conduits 34 are fixed in position with respect to the frame 14 and preferably terminate at the opposite ends thereof inside of the fenders of the opposite driving wheels 18 so that they direct a flow of exhaust gases to the front and rear tread surfaces of tires T that are mounted on the driving wheels as shown in FIG. 6.

The device 10 is preferably located downstream of the muffler 22, and accordingly in its normal, closed, non-diverting position will direct exhaust gases to the rear exhaust pipe 24 of the exhaust system. In order to divert the exhaust gases to the driving wheels 18, the device 26 includes a valve member 40 in the form of a plate to the rear section 42 of which a shaft 44 is secured, the shaft 44 extending through opposite sides of the central section 27. The shaft 44 is mounted for pivotal movement within pillow blocks 46 attached to the outside surface of the central section 27 of the body 26. Secured to one end of the shaft 44 is a crank portion 48 which terminates in an eye portion 50 that receives a cable 52 therein. The other end of the cable 52 is, in turn, mounted on the conventional control panel (not shown) located within the driving compartment of the vehicle and is connected to a hand control member 53.

The valve member 40 is normally biased by gravity into contact with a valve seat 54 that surrounds the opening 36. In the position of use wherein exhaust gases are diverted into the conduits 34 the valve member 40 engages a second or upper circumferential valve seat 56 which is joined to the interior surface or the central section 27 of the valve body 26. The configuration of the valve member 40 is best shown in FIG. 2 and includes a body 58 of longitudinally oriented or elongated configuration and an arcuate distal portion 60. The second valve seat 56 is of a generally oval configuration and is angled with respect to the adjacent inner wall of the body 26 as shown in FIG. 3. It is seen that the configuration of valve seat 54 and 56 is such as to accommodate peripheral edges of the valve member 40 as the valve member is moved to and from the open and closed positions thereof.

When it is desired to remove ice or snow from either the tread of the driving wheel tires or the area beneath the tires, the cable 52 is manipulated so as to raise the valve member 40 to its upper position as shown by the dotted lines in FIG. 3. In this position exhaust gases passing from the engine will be diverted into the conduits 34 and are then directed to opposite sides of the driving wheel tires T and into the forward and rearward paths thereof. Preferably the exhaust gases are directed tangentially to the tire surfaces as illustrated in FIG. 6 to promote the maximum effect thereon. The heat of the exhaust gases as tangentially directed to the tires softens or melts ice or snow accumulated thereon in the path thereof and accordingly enables the tire to gain a more favorable traction upon the driving surface. Also by directing the flow of such exhaust gases tangentially to both the forward and rear surfaces of the tire, the advantages gained by the use of this device are obtainable whether the vehicle is moving forward or rearwardly. Often it is required to somewhat rock the automobile to gain a proper traction or footing for the tires in order to remove the vehicle from an icy patch or a snow encrusted area. Additionally, it may be desirable to utilize the device in wet weather to prevent hydroplaning, i.e. a dangerous condition brought about by the traveling of the vehicle's wheels on a sheet of water. In such cases the water that tends to build up both in the forward travel path of the automobile and within the surface treads of the tire tends to be removed by the simultaneous direction of exhaust gases to opposite sides of the tire, as shown in FIG. 6. In such cases when hydroplaning is desired to be specifically eliminated or when dealing with four wheel drive vehicles it may be desirable to direct additional conduits 34 to each of the vehicle wheels.

Referring now to FIGS. 7-12, a modified form of the invention is illustrated and is generally indicated at 62. The device 62 is mounted on a pipe 64 extending rearwardly of the muffler 22 and includes a housing generally indicated at 66, having a rear wall 68, a front wall 70, side walls 72 and 74, top wall 76 and bottom wall 78. Joined to the rear wall 68 of the housing 66 is a rear tubular extension 80, while joined to the front wall 70 is a front tubular extension 81. The front tubular extension 81 is mounted on the pipe 64 and is secured thereon by a clamp 82, while the rear tubular extension 80 is mounted on the exhaust pipe 24 and is fixed thereto by a clamp 84. As shown in FIG. 1, the exhaust pipe 24 extends to the rear end of the vehicle for discharging engine combustion products in the well known manner. Fixed to the side wall 74 of the housing 66 and communicating with the interior thereof are a pair of pipes 86 and 88 on which flexible conduits are mounted that are fixed to the frame 14 and terminate at the outer ends thereof inside of the fenders of the adjacent rear wheels 18 for directing a flow of exhaust gases to the front and rear tread surfaces of the adjacent tire T. Joined to the opposite side wall 72 and communicating with the interior of the housing 66 are a pair of pipes 90 and 92 on which arms 106,108 and their respective shafts 98,100 on which the valve members 94 and 96 are mounted. As shown in FIG. 8, arms 116 and 118 are mounted on the opposite ends of the shafts 98 and 100, and are interconnected at their outer ends by a spring 120, the spring 120 thus acting to locate the valve members 94 and 96 in the normal position as seen in FIG. 11.

In use of the modified form of the invention, the valve members 94 and 96 are normally located in the position shown in FIGS. 11 and 13, for sealing communication between the pipes 86,88 and 90,92 and the interior of the housing 66. Exhaust products from the engine 16 are thus discharged through the tail pipe 24. When the vehicle is traveling in snow, ice or rain, the operator pulls the flexible cable 110 through an actuating knob located on the vehicle dashboard and locks it in place. This movement pivots the arms 106 and 108 and the arms 116,118 mounted on the shafts 98 and 100 to locate the valve members 94 and 96 in the position shown in FIGS. 12 & 14. Communication is thus sealed off between the tail pipe 24 and the interior of the housing 66. Exhaust products are then deflected or diverted through the pipes 86,88 and 90,92 to the flexible conduits joined thereto for discharge of the hot exhaust products at the base of the tread of the rear tires T. It is seen that the inclined configuration of the valve members 94 and 96 in the diverting position acts to equally distribute the discharge products through the pipes 86,88 and 90,92 and provides for smooth even flow of the flexible conduits are mounted that are also fixed to the frame 14 and terminate at their outer ends inside of the fenders of the adjacent rear wheels 18.

As described above, the exhaust gases from the engine 16 are normally directed through the muffler 22 and exhaust pipe 24 for discharge at the rear end of the vehicle. In order to divert the exhaust gases to the pipes 86,88 and 90,92 for discharge through the flexible conduits joined thereto, diverter valve members 94 and 96 are provided and are pivotally mounted interiorly of the housing 66 as shown in FIGS. 11 and 12. Shafts 98 and 100 project through the housing 66 for pivotally mounting the valve members 94 and 96 therein and are journalled in top and bottom walls 76 and 78, the ends of the shafts 98 and 100 projecting beyond the top and bottom walls as illustrated in FIGS. 8 and 10. Inclined stops 102 and 104 are formed on the interior of the top and bottom walls of the housing and receive the valve members 94 and 96 thereagainst for locating the valve members in the diverting position as will be described hereinafter.

In order to move the valve members from the normal position as seen in FIG. 11 to the diverting position as shown in FIG. 12, actuating arms 106 and 108 are provided and are secured to the shafts 98 and 100 respectively. A flexible cable 110 that extends from the dashboard of the vehicle is interconnected to the actuating arms 106,108 through a flexible connector member 112 and coupling 114, and it is seen that an outward force exerted on the cable 110 will pivotally move the actuating discharge products to the flexible conduits. When the operator knob is released, the spring 120 that had been tensioned, as shown in FIG. 14 upon movement of the valve members to the diverting position, returns the valve members to the normal position as seen in FIG. 13.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A safety device for use with a motor vehicle having an engine, a pair of driving wheels operatively associated therewith, an engine exhaust system including an exhaust pipe for receiving and discharging hot exhaust gases from said engine and a muffler connected to said exhaust pipe at an intermediate point thereof comprising, a valve assembly adapted for mounting within said exhaust system, said valve assembly including a body having an inlet for receiving a portion of said exhaust pipe downstream from said muffler, said body also having an outlet for receiving another portion of said exhaust pipe for discharging said exhaust gases from said exhaust system, pairs of conduits terminating at an end thereof adjacent to the tread surfaces of the tires mounted on each of said driving wheels, each of said pair of conduits connected at the other ends thereof to said body in a common connection for communication with the interior of said body, a pair of valve members positioned in said body upstream of the common conduit connections, said valve members being movable to an inclined position with respect to the normal direction of flow of said exhaust gases for directing said exhaust gases through said conduits, and means for operating said valve members for moving them to their inclined position wherein exhaust gases are diverted through said conduits and for returning said valve members to the normal positions thereof, wherein said exhaust gases are discharged through said exhaust pipe, said valve members normally being located in planes parallel to the flow of said gases to said exhaust pipe and being movable by said operating means to the inclined position relative to the flow of said gases, wherein said valve members act to divert said exhaust gases into said conduits, said operating means including a pair of shafts on which said valve members are mounted for movement therewith, said shafts extending through said body exteriorly thereof, a first set of arms joined to said shafts, spring means interconnecting said arms and being operable to normally locate said valve members in the position that closes communication to said conduits, a second set of arms joined to said shafts, and a flexible cable interconnected to said second set of arms for pivotally moving said second set of arms, wherein said shafts are rotated to move said valve members to the position that diverts said gases into said conduits.

* * * * *